(12) United States Patent
Rakshit et al.

(10) Patent No.: US 10,978,064 B2
(45) Date of Patent: Apr. 13, 2021

(54) CONTEXTUALLY RELEVANT SPOKEN DEVICE-TO-DEVICE COMMUNICATION BETWEEN IOT DEVICES

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Cary, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/205,267

(22) Filed: Nov. 30, 2018

(65) Prior Publication Data
US 2020/0175976 A1 Jun. 4, 2020

(51) Int. Cl.
*G10L 15/22* (2006.01)
*H04L 29/08* (2006.01)
*G06F 16/487* (2019.01)

(52) U.S. Cl.
CPC ............ *G10L 15/22* (2013.01); *G06F 16/487* (2019.01); *H04L 67/125* (2013.01); *G10L 2015/223* (2013.01)

(58) Field of Classification Search
CPC .... G06F 3/167; G10L 15/22; G10L 2015/223
See application file for complete search history.

(56) References Cited

U.S. PATENT DOCUMENTS

| | | | |
|---|---|---|---|
| 6,839,670 | B1 | 1/2005 | Stammler et al. |
| 7,762,665 | B2 | 7/2010 | Vertegaal et al. |
| 9,400,943 | B2 | 7/2016 | Sharma et al. |
| 9,438,440 | B2 | 9/2016 | Burns et al. |
| 9,853,826 | B2 | 12/2017 | Shuman et al. |
| 10,057,125 | B1* | 8/2018 | Roman ................ H04W 8/005 |
| 10,102,855 | B1* | 10/2018 | Sindhwani ............ G10L 15/22 |
| 2010/0188279 | A1* | 7/2010 | Shamilian ............. H04L 67/34 341/176 |
| 2015/0029880 | A1* | 1/2015 | Burns .................... G01S 11/16 370/252 |

(Continued)

FOREIGN PATENT DOCUMENTS

WO 2017171876 A1 10/2017

*Primary Examiner* — Samuel G Neway
(74) *Attorney, Agent, or Firm* — William H. Hartwell

(57) ABSTRACT

In one embodiment, in accordance with the present invention, a method for incorporating human comprehension and interaction with device-to-device communication between devices as they occur in a person's immediate surroundings. The method includes detecting that a user is present, wherein the user is detected by a first instance of a smart assistant software executing on the first device. The method further includes identifying an occurrence of a monitored event. The method further includes, in response to identifying the occurrence of the monitored event, determining a task to be performed by a second device. The method further includes generating instructions for instructing the second device to perform the task, wherein the generated instructions include a verbal command and audibly emitting the verbal command, wherein the audibly emitted verbal command is within audible range of both the user and the second device.

17 Claims, 7 Drawing Sheets

(56) References Cited

U.S. PATENT DOCUMENTS

| | | | |
|---|---|---|---|
| 2015/0134761 A1* | 5/2015 | Sharma | H04L 67/22 |
| | | | 709/207 |
| 2015/0242899 A1* | 8/2015 | Farhi | G06Q 30/0261 |
| | | | 705/14.58 |
| 2016/0261824 A1* | 9/2016 | Scalisi | G08B 13/19636 |
| 2017/0090442 A1* | 3/2017 | Chien | G06F 3/167 |
| 2017/0345420 A1* | 11/2017 | Barnett, Jr. | G10L 15/30 |
| 2017/0361468 A1* | 12/2017 | Cheuvront | G06F 16/00 |
| 2018/0007055 A1 | 1/2018 | Infante-Lopez et al. | |
| 2018/0048680 A1 | 2/2018 | Nambi | |
| 2018/0146042 A1* | 5/2018 | Choi | G01S 5/0252 |
| 2018/0167908 A1* | 6/2018 | Kotreka | H04W 4/029 |
| 2018/0233147 A1* | 8/2018 | Tukka | H04L 67/025 |
| 2018/0261070 A1* | 9/2018 | Stevens | H04W 4/70 |

* cited by examiner

CONTEXTUALLY RELEVANT SPOKEN DEVICE-TO-DEVICE COMMUNICATION BETWEEN IOT DEVICES

BACKGROUND

The present invention relates generally to the field of device-to-device communication, and more particularly to device-to-device communication between Internet of Things (IoT) devices as events occur in a person's immediate surroundings.

In the technical field of IoT devices, communication to the IoT devices often includes human-to-device communication. For example, a user utilizes an application on a mobile device to raise the temperature on a connected thermostat remotely. Oftentimes device-to-device communication is also used in IoT scenarios. For example, a connected camera may notice debris on a floor, and communicate with a connected robot cleaner to dispatch the robot cleaner to clean up the debris. These interactions occur without direct user input.

A Smart Assistant is a software agent that can perform tasks or services for an individual. Smart assistant software can be used to create a "Smart Home" using IoT devices such as appliances, lighting, heating, air conditioning, TVs, computers, entertainment audio & video systems, security, and camera systems that are capable of communicating with one another and can be controlled remotely by a time schedule, from any room in the home, as well as remotely from any location in the world by phone or internet.

SUMMARY

Embodiments of the present invention disclose a method, computer program product, and system for incorporating human comprehension and interaction with device-to-device communication between devices as events occur in a person's immediate surroundings. The method includes detecting, by one or more computer processors of a first device, that a user is present, wherein the user is detected by a first instance of a smart assistant software executing on the first device. The method further includes identifying, by one or more computer processors of the first device, an occurrence of a monitored event. The method further includes, in response to identifying the occurrence of the monitored event, determining, by one or more computer processors of the first device, a task to be performed by a second device, wherein a second instance of a smart assistant software is executing on the second device. The method further includes generating, by one or more computer processors of the first device, instructions for instructing the second device to perform the task, wherein the generated instructions include a verbal command and audibly emitting, by one or more computer processors of the first device, the verbal command, wherein the audibly emitted verbal command is within audible range of both the user and the second device.

DETAILED DESCRIPTION

Figure 1:
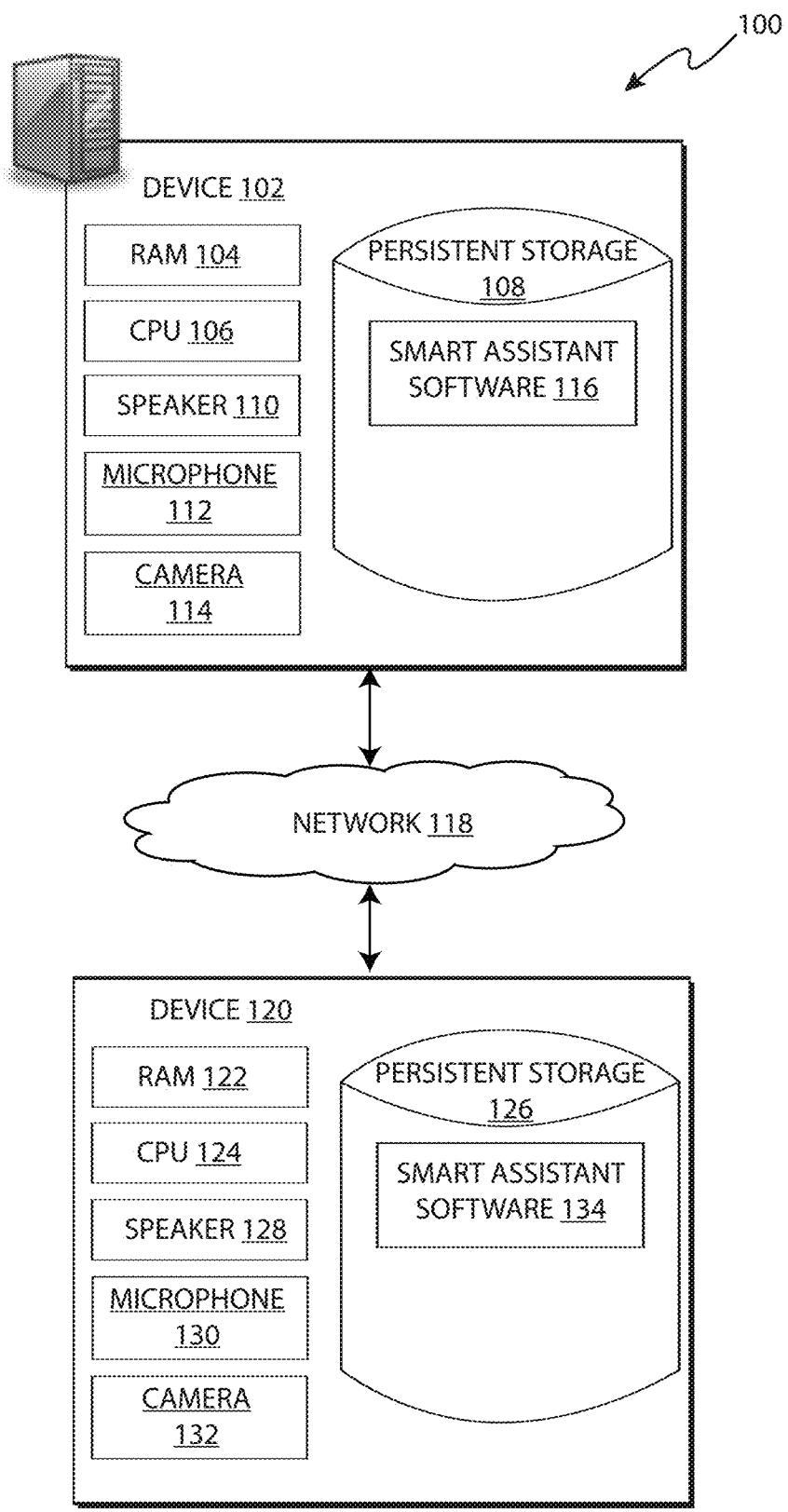
FIG. 1 is a functional block diagram illustrating a smart assistant environment, in an embodiment in accordance with the present invention.

Embodiments in accordance with the present invention recognize that, in a smart assistant environment, there may be times when a user would like to modify, cancel, or append a command issued between Internet of Things (IoT) devices. The IoT is a network of physical devices, vehicles, home appliances, etc. embedded with electronics, software, sensors, actuators, and connectivity which enables these objects to connect and exchange data. The physical devices are uniquely identifiable through respective embedded computing systems. However, the physical devices are able to inter-operate within the existing Internet infrastructure, through which the IoT devices are sensed and/or controlled remotely allowing the integration of the physical world to computer-based systems. A growing portion of IoT devices are created for use by consumers (e.g., vehicles, home automation, wearable technology, quantified self, connected health, appliances, etc.). The data from IoT devices may be raw or preprocessed before analytics are applied. For example, an IoT connected device in a user's home may detect dirt and/or debris on a floor and dispatch a cleaning robot. However, the user, upon noticing that the cleaning robot is being dispatched to clean up the dirt and/or debris, may need the cleaning robot to also clean in another area of the home that is not included as a part of the task to clean up the dirt. Another example would be a situation where the user may want to cancel the dispatched cleaning robot due to the time of day the task is being performed. In yet another example, a user may want to halt or stop a dispatched cleaning robot due to the dirt and/or debris being dirt and/or debris that is not easily able to be cleaned by the cleaning robot.

Embodiments of the present invention disclose a smart assistant software using audible device-to-device IoT communication to incorporate nearby people. The device-to-device communication can inform a user as to what is happening and further enable the user to alter or append an issued command. In the context of the present invention, a nearby person is defined to be within a determined distance to hear and/or see an IoT device, or to be within the same room as the IoT device. For example, when a nearby user is detected—and it is contextually appropriate to do so (e.g., is the current activity of the user is not determined to be "do not disturb")—communication between IoT devices occurs via verbal commands that the nearby user can hear. The verbal communication from the IoT device enables the nearby person to understand the action that the IoT device is initiating (e.g., "the robot cleaner is being deployed to clean up a mess"), and thereby allows the nearby person to make changes to the action the IoT device is performing by issuing a verbal command through their own voice (e.g., "clean up the mess by the counter while you are at it"). As a result, the smart assistant software enables the deployed cleaning robot to clean up both areas of the user's home, thereby improving smart assistant software and the efficiency of smart assistant technology.

Embodiments of the present invention improve smart assistant software and smart assistant technology by providing a verbal spoken device-to-device communication mechanism between IoT devices in the presence of a nearby user when the system determines such verbal communication to be contextually appropriate. For example, the smart assistant software can customize the verbal spoken device-to-device communication (e.g., verbal command), based on the nearby user so that the description of the activity being performed is in terms that the user is able to understand, or in terms the user prefers to hear. For example, a customization level can be defined for one or more users and stored in a user profile, wherein the customization can include a level of detail in the verbal command, a current activity of the user to be considered as to not disturb the user, and a contextual relevance of the verbal command to the user.

Embodiments of the present invention improve smart assistant software and smart assistant technology by providing the capability of a nearby user hearing verbal spoken device-to-device communication between two or more IoT devices, to modify, cancel, or append a command based on the user's own voice instructions. For example, upon hearing a verbal command to dispatch a cleaning robot to a certain location in a home, a user can modify the command to add a second location for the cleaning robot to service. Another example would be, upon hearing a verbal command to dispatch a cleaning robot to a certain location in a home, a user can delay the cleaning task by an hour because an infant is sleeping. Other actions include delaying the cleaning task due to the user expecting an important phone call, or the user setting a conditional command where the cleaning robot vacuums an area until a phone rings, then pauses until it hears the word goodbye.

Embodiments of the present invention improve smart assistant software and smart assistant technology by providing a customization of the verbal spoken device-to-device communication between two or more IoT devices that is tailored to the level of detail appropriate to a nearby user overhearing the verbal command. For example, upon returning home in the evening, when entering the home, the smart assistant software can detect the user and issue a verbal command to automatically turn on the lights via a smart light switch. Prior to emitting the verbal command to turn on the lights, the smart assistant software can determine that the user prefers the lights at a certain level. After determining the preferred light intensity level of the user, smart assistant software emits the verbal command and includes the user's preferred light intensity level in the verbal command. In another example, upon waking up in the morning, the smart assistant software, using an IoT enabled alarm clock, can turn on the lights in a series of events to wake a user. For example, smart assistant software can emit a verbal command to begin playing a playlist of the user's favorite songs and emit a second verbal command to turn on the light to a low level as to not hurt the user's eyes. As smart assistant software monitors the user's progress in waking up, smart assistant software can periodically emit verbal commands to increase the light intensity.

Embodiments in accordance with the present invention will now be described in detail with reference to the Figures. FIG. 1 is a functional block diagram, generally designated 100, illustrating a smart assistant environment, in an embodiment in accordance with the present invention.

Smart assistant environment 100 includes device 102, device 120, and other computing devices (not shown), all interconnected over network 118. Device 102 and device 120 are objects that can be assigned an Internet Protocol (IP) address and include the ability to connect, transmit, exchange, and transfer data over network 118. Device 102 and device 120 can include physical devices, wearable devices, implantable technology, vehicles sensors (e.g., safety and security, powertrain/fuel economy, infotainment, and telematics), home sensors (e.g., energy efficiency, home environment monitoring, resident well-being, smart homes, smart thermostats), home appliances (e.g., smart appliances, smart TV, etc.), and other non-standard computing devices that are embedded with electronics, software, sensors, actuators, and connectivity. In some example embodiments, device 102 and device 120 are wearable devices (e.g., activity trackers, smart watches, pedometers, sleep apnea detector, heart rate monitor, watches, glasses, contact lenses, e-textiles and smart fabrics, jewelry, etc.). Some wearable devices perform health monitoring of vital signs such as heart rate, heart rate recovery, heart rate variability, $VO_2$ max, minute ventilation, respiration rate, breathing efficiency, body temperature, blood pressure, blood glucose levels, insulin delivery, activity, posture, cadence, bounce, braking, pelvic rotation, pelvic drop, muscle activity, activity level, acceleration, calories, steps, fatigue levels, workout effort, emotional wellness, muscle tension, sleep, and any other measurable vital signs. Smart clothes (e.g., electronic textiles, smart garments, smart textiles, smart fabrics, etc.) include fabric that envelopes traditional sensor electronics, and fabric in which the weaving incorporates electrically conductive yarn into the fabric to obtain a textile that connects multiple sensors to the body of the wearer for health monitoring of vital signs (e.g., heart rate, temperature, activity, and posture). For example, smart socks include: pressure sensors that identify the striking of the heel or the ball of wearers foot when walking, a foot heat-map, foot landing, contact time on the ground, cadence, pace, heart rate, speed, distance, altitude gains, GPS track, etc., which can provide a podiatrist with information to treat a client experiencing issues related to the foot, ankle, and structures of the leg.

Device 102 includes random access memory (RAM) 104, central processing unit (CPU) 106, persistent storage 108, speaker 110, microphone 112, and camera 114. Device 102 may be a Web server, or any other electronic device or computing system, capable of processing program instructions and receiving and sending data. In some embodiments, device 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, device 102 may represent server computing systems utilizing multiple computers as a server system, such as in a distributed computing environment. In general, device 102 is representative of any electronic device or combinations of electronic devices capable of executing machine-readable program instructions and communicating with device 120 via network 118 and with various components and devices (not shown) within smart assistant environment 100.

Device 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information.

Smart assistant software 116 is stored in persistent storage 108, which also includes operating system software (not shown), as well as software that enables device 102 to incorporate human comprehension and interaction with device-to-device communication between IoT devices as they occur in a user's immediate surroundings, and other computing devices (not shown) of smart assistant environment 100 over a data connection on network 118. In other example embodiments, smart assistant software 116 may be components of an operating system software.

Smart assistant software 116 is a computer program, or a set of computer programs, that is stored in persistent storage 108. Smart assistant software 116 enables device 102 to improve device-to-device IoT communication by informing nearby users of what is happening and enabling the nearby users to alter what is communicated between IoT devices. Additionally, smart assistant software 116 enables device 102 to improve the quality of the instructions provided between the IoT devices by adding additional instructions to the communications. Furthermore, upon detecting a nearby user—and determining it is contextually appropriate to do so—communication between IoT devices occurs via verbal commands that the nearby users can hear. By verbalizing the commands, smart assistant software 116 enables the nearby users to understand what is happening (e.g., "the cleaning robot is being deployed to clean up a mess") and to make changes to the command through the user's own voice (e.g., "clean up the mess by the counter while you are at it").

Device 102 includes speaker 110 (i.e., human interface element). Speaker 110 is used by smart assistant software 116 to emit sounds corresponding to generated verbal commands for device 120. In one embodiment, speaker 110 may be used by smart assistant software 116 solely. In another embodiment, speaker 110 may be used by other software applications and components of device 102 in conjunction with smart assistant software 116. In other embodiments, speaker 110 may be an additional component to device 102 used by other computing devices (not shown) via network enabled APIs.

Device 102 includes microphone 112. Microphone 112 enables device 102 to capture one or more audio streams of one or more users in the physical space surrounding the physical area of device 102. For example, a user can configure smart assistant software 116 with a user profile that includes one or more captured and stored audio streams of the user. In one example embodiment, a user of device 102 can manually enable/disable microphone 112. In other example embodiments, microphone 112 can be enabled/disabled by smart assistant software 116. In yet another example embodiment, smart assistant software 116 can receive audio data (e.g., a command from a user), from microphone 112 upon emitting a verbal command to device 120.

Device 102 includes camera 114. Camera 114 enables a user of device 102 to capture images or video streams of his/her self or the physical space surrounding the physical area of device 102. For example, a user can configure smart assistant software 116 with a user profile that includes one or more captured and stored images and video streams of the user. In one example embodiment, a user of device 102 can manually enable/disable camera 114. In other example embodiments, camera 114 can be enabled/disabled by smart assistant software 116. In yet another example embodiment, smart assistant software 116 can receive images and/or video data from camera 114 upon emitting a verbal command via speaker 110 to device 120. Device 102 may include internal and external hardware components, as depicted and described in further detail with respect to FIG. 7.

In FIG. 1, network 118 is shown as the interconnecting fabric between device 102, device 120, and with various components and devices (not shown) within smart assistant environment 100. In practice, the connection may be any viable data transport network, such as, for example, a LAN or WAN. Network 118 can be for example, a local area network (LAN), a wide area network (WAN) such as the Internet, or a combination of the two, and include wired, wireless, or fiber optic connections. In general, network 118 can be any combination of connections and protocols that will support communications between device 102, device 120, and with various components and devices (not shown) within smart assistant environment 100.

Device 120 is included in smart assistant environment 100. Device 120 includes random access memory (RAM) 122, central processing unit (CPU) 124, and persistent storage 126. Device 120 may be a Web server, or any other electronic device or computing system, capable of processing program instructions and receiving and sending data. In some embodiments, device 120 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, device 120 may represent server computing systems utilizing multiple computers as a server system, such as in a distributed computing environment. In general, device 120 is representative of any electronic devices or combinations of electronic devices capable of executing machine-readable program instructions and communicating with device 102 via network 118 and with various components and devices (not shown) within smart assistant environment 100.

Device 120 includes persistent storage 126. Persistent storage 126 may, for example, be a hard disk drive. Alternatively, or in addition to a magnetic hard disk drive, persistent storage 126 may include a solid state hard drive, a semiconductor storage device, read-only memory (ROM), erasable programmable read-only memory (EPROM), flash memory, or any other computer-readable storage medium that is capable of storing program instructions or digital information.

Smart assistant software 134 is stored in persistent storage 126, which also includes operating system software (not shown), as well as software that enables device 120 to incorporate human comprehension and interaction with device-to-device communication between IoT devices as they occur in a user's immediate surroundings, and other computing devices (not shown) of smart assistant environment 100 over a data connection on network 118. In other example embodiments, smart assistant software 134 may be components of an operating system software.

Smart assistant software 134 is a computer program, or a set of computer programs, that is stored in persistent storage 126. Smart assistant software 134 enables device 120 to receive an additional verbal command from a user that alters or appends the received command from smart assistant software 134. In other example embodiments, an altered or appended verbal command from a user may be received from device 102 upon device 120 receiving the additional command from the user. For example, upon hearing the emitted verbal command (e.g., "dispatching the cleaning robot to clean by the refrigerator"), a user may add a second location for the cleaning robot to service (e.g., "and by the sink"). Upon updating the previous verbal command smart assistant software 134 on device 120 may reiterate the updated verbal command (e.g., "dispatching the cleaning robot to clean by the refrigerator and by the sink"), or only the additional element (e.g., "and by the sink").

Device 120 includes speaker 128 (i.e., human interface element). Speaker 128 is used by smart assistant software 134 to emit sounds corresponding to generated verbal commands for device 120. In one embodiment, speaker 128 may be used by smart assistant software 134 solely. In another embodiment, speaker 128 may be used by other software applications and components of device 120 in conjunction with and smart assistant software 134. In other embodiments, speaker 128 may be an additional component to device 120 used by other computing devices (not shown) via network enabled APIs.

Device 120 includes microphone 130. Microphone 130 enables device 120 to capture one or more audio streams of one or more users in the physical space surrounding the physical area of device 120. For example, upon performing a task issued by device 102, a user can add an additional task for device 120 to execute. Smart assistant software 134 can receive the additional task through microphone 130. In one example embodiment, a user of device 102 can manually enable/disable microphone 130. In other example embodiments, microphone 130 can be enabled/disabled by smart assistant software 134. In yet another example embodiment, smart assistant software 134 can receive audio data from microphone 130 upon receiving a verbal command from device 102. In other example embodiments, device 120 can receive an additional verbal command, or an update to the current executing verbal command via microphone 130.

Device 120 includes camera 132. Camera 132 enables device 120 to capture images or video streams of the physical space surrounding the physical area of device 120. For example, device 120 can enable camera 132 to navigate the physical space surrounding the area of device 120. In one example embodiment, a user of device 120 can manually enable/disable camera 132. In other example embodiments, camera 132 can be enabled/disabled by smart assistant software 134. In yet another example embodiment, smart assistant software 134 can receive images and/or video data from camera 132 upon receiving a verbal command from device 102.

Figure 2:
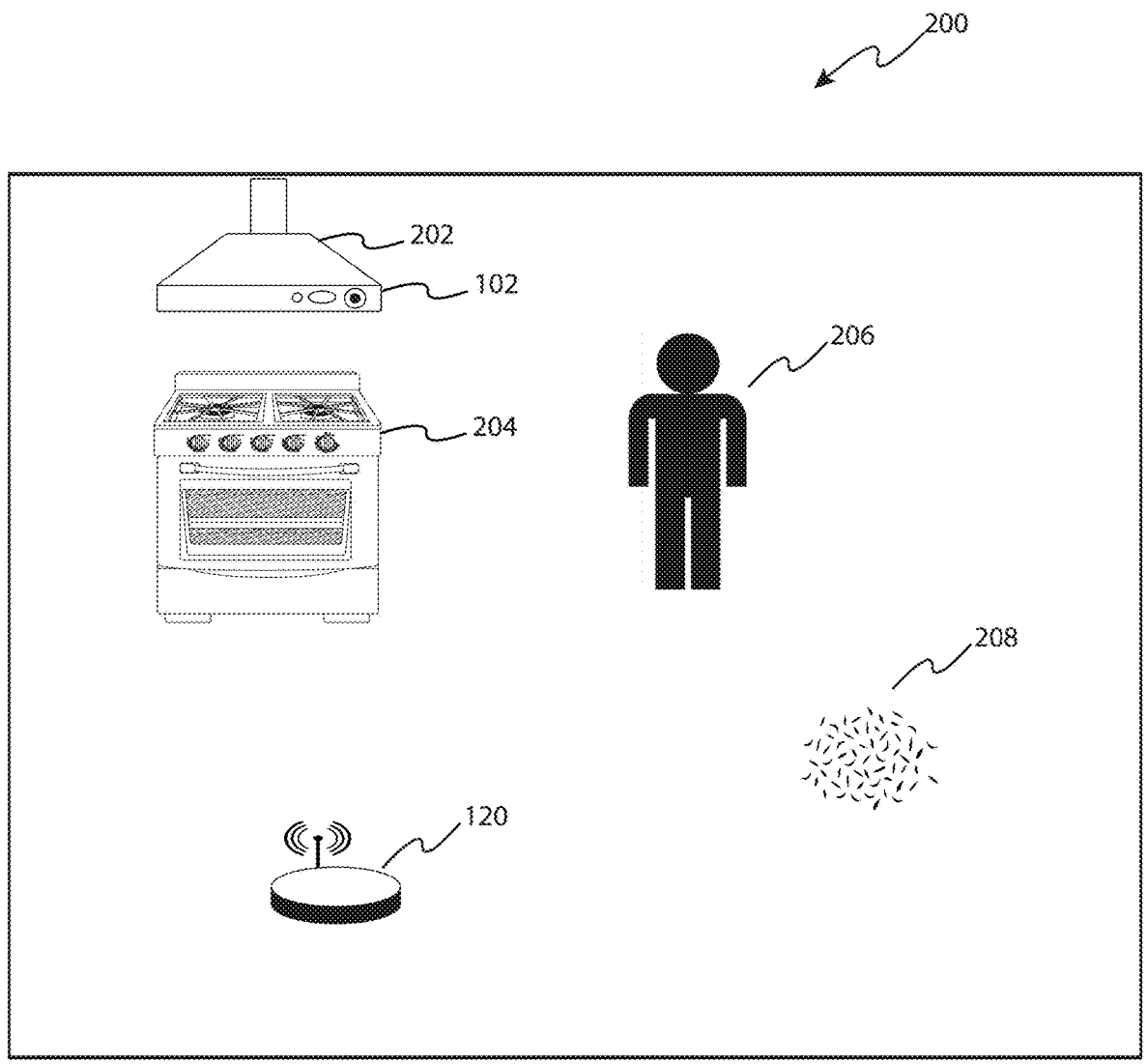
FIG. 2 depicts a device-to-device communication within the smart assistant environment of FIG. 1, in an embodiment in accordance with the present invention.
Figure 3:
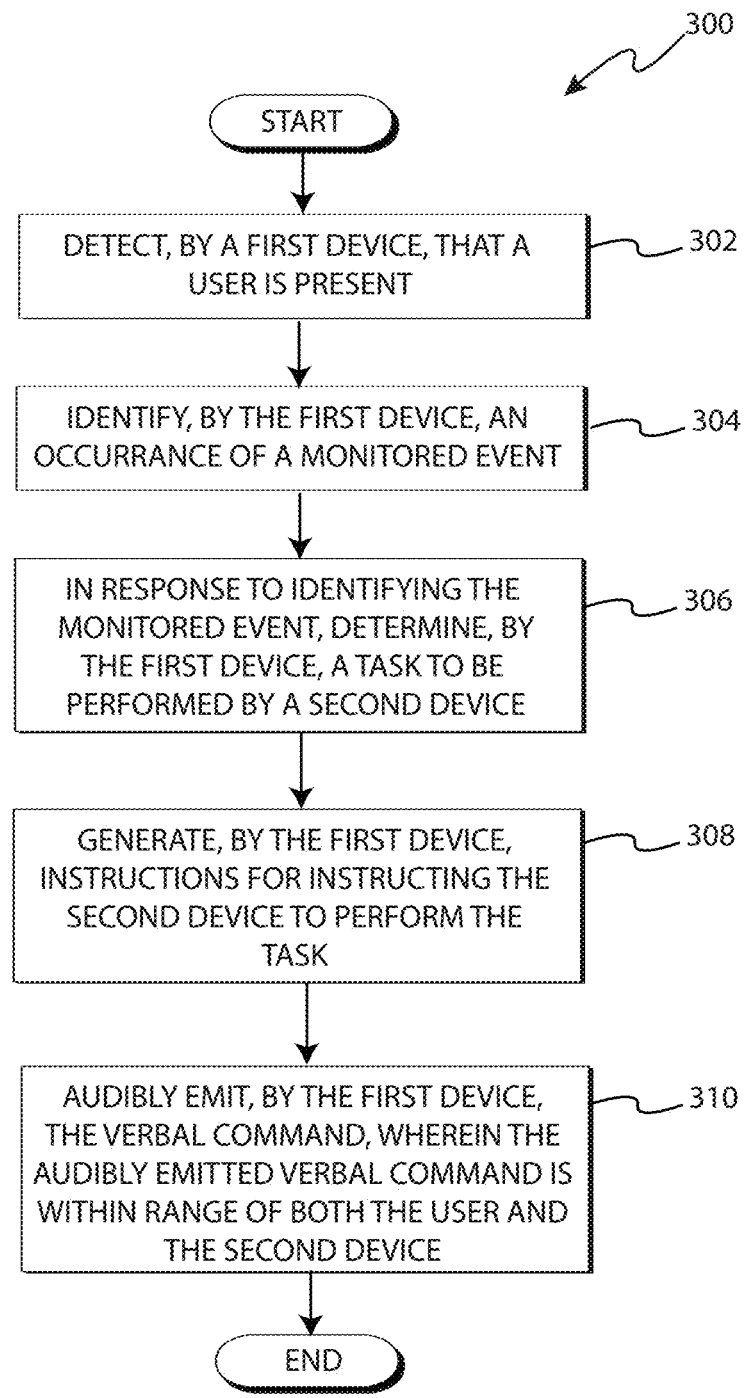
FIG. 3 is a flowchart depicting operational steps of a smart assistant software, on a computer within the smart assistant environment of FIG. 1, for performing a device-to-device communication that enables a user to hear a verbal command, in an embodiment in accordance with the present invention.

FIG. 2, generally designated 200, depicts a device-to-device communication within the smart assistant environment of FIG. 1, in an embodiment in accordance with the present invention. FIG. 3, generally designated 300, is a flowchart depicting operational steps of a smart assistant software facilitating the device-to-device communication of FIG. 2, within the smart assistant environment of FIG. 1, in an embodiment in accordance with the present invention. In an example embodiment, smart assistant software 116 of device 102 detects that user 206 is nearby as described in step 302 and illustrated in FIG. 2. In the example embodiment of FIG. 2, kitchen environment 200 includes an IoT enabled stove hood vent 202, which is above stove 204, and contains device 102. For example, smart assistant software 116 uses camera 114 to capture one or more images and/or video streams of the nearby user. Smart assistance software 116 derives the identity of user 206 by comparing the captured one or more images and/or video streams of the nearby user to one or more stored images and/or video streams in a user profile. In other example embodiments, smart assistant software 116 further categorizes the nearby user's age range, gender, and an activity (e.g., sleeping, cleaning, eating dinner, talking on the phone, watching TV, or exercising) the nearby user is engaged in to better identify the nearby user.

In another example embodiment, smart assistant software 116 identifies the nearby user using microphone 112. For example, smart assistant software 116 can capture one or more audio streams of the nearby user and use voice recognition software (not shown) to identify the names or categorizations of voices (e.g., how many people are nearby, the names, age ranges, and genders). Smart assistant software 116 then derives the identity of user 206 by comparing the captured one or more audio streams of the nearby user to one or more stored audio streams in a user profile. In other example embodiments, smart assistant software 116 can learn the identity of a user through exposure. For example, smart assistant software 116 can learn the preferred level of detail of a user based on the user's responses to verbal commands. For example, smart assistant software 116 can identify the tone and pitch of a user's voice. In other example embodiments, smart assistant software 116 can identify a user via one or more learned ranges and varying volume levels of a user's voice.

In yet another example embodiment, smart assistant software 116 can identify one or more nearby users based on wearable device detection. For example, smart assistant software 116 detects of the presence of a nearby user through devices that the nearby user is using or wearing, such as using triangulation of a Bluetooth signal emitted from the user's smart phone or smart watch. Smart assistant software 116 can then, in combination with analyzed data from microphone 112 and camera 114, determine the identity of user 206 and whether the user 206 is within distance to hear an emitted verbal command. In another example embodiment, smart assistant software 116 can identify a user using the global positioning system (GPS) feature of a smart watch or a smart phone. In other example embodiments, smart assistant software 116 can also determine who the user is based on which device is paired with speaker 110. For example, a first user and a second user can both, at individual times, pair smart phones or tablet devices with speaker 110 when in the same room with smart assistant 116. For example, when the first user enters a kitchen area to begin preparing a meal, the first user's smart phone can automatically pair with speaker 110 to play music while the first user cooks. At a different time of day, the second user may enter the kitchen area to eat breakfast. Upon entering the kitchen area, the second user's tablet device can pair with speaker 110 to broadcast the morning news. Smart assistant software 116 can determine which user is present based on which device is paired with speaker 110. In other example embodiments, smart assistant software 116 can determine the location of a user by using acoustic location techniques to determine distance and direction of a sound source, wherein the sound can be described using physical quantities such as sound pressure and particle velocity to obtain a source direction.

In another example embodiment, smart assistant software 116 can identify user 206 via a fitness tracking device (not shown) worn by user 206. A fitness tracking device is a physical activity tracking device. Fitness trackers (e.g., physical activity tracker) are devices and/or applications that monitor and track fitness-related metrics pertaining to physical activity such as distance, heartbeat, quality of sleep, type of activity, length of activity, etc. In one embodiment, the fitness tracking device can be an upgraded version of a pedometer, that in addition to counting steps, utilizes accelerometers, altimeters, and gyroscopes to calculate mileage, graph overall physical activity, and calculates calorie expenditure.

In other example embodiments, the fitness tracking device can include a global positioning system that includes a system that utilizes satellites in order to provide autonomous geo-spatial positioning. Small electronic receivers within the fitness tracking device determine location (longitude, latitude, and altitude/elevation) to high precision using time signals transmitted along a line of sight from satellites. Smart assistant software 116 can utilize the GPS capabilities of the fitness tracking device to determine the distance that user 206 is and an associated physical activity.

In step 304, smart assistant software 116 identifies an occurrence of a monitored event. For example, in response to user 206 dropping, and breaking, dish 208 on the floor, smart assistant software 116 detects the glass breaking on the floor using camera 114 and microphone 112. Additionally, smart assistant software 116 locates the dish 208 as it is falling and then shatters on the floor using camera 114. In response, smart assistant software 116 identifies a task from a plurality of defined tasks that are performable by device 120, wherein the occurrence of the monitored event matches one or more requirements of the identified task. For example, smart assistant software 116 can gather one or more requirements of the identified task, such as an appropriate IoT device to use for the task. In other example embodiments, smart assistant software 116 continuously monitors the physical area around device 102 and device 120 to identify occurring events that require an action by smart assistant software 116.

In response to identifying the monitored event, smart assistant software 116 determines a task to be performed by device 120 as depicted in step 306. For example, smart assistant software 116 can derive an appropriate verbal command based on the identity of user 206 and a current activity user 206 is currently engaged in. For example, using the identified user profile, smart assistant software 116 can determine a level of detail to include in the verbal command. For example, the user may want to know detailed information pertaining to the area. As such, smart assistant software 116 may include the physical area in the verbal command as "in the kitchen near the refrigerator." Smart assistant software 116 can further customize the verbal command by determining a current activity of user 206 based on one or more profile settings for user 206. For example, user 206 can define a customization level in a user profile that includes a level of detail, wherein the level of detail determines an amount of the one or more details to be included in the verbal command, a current activity of the user, and a contextual relevance, wherein the contextual relevance determines whether the user would prefer to hear the verbal command based on the user's current activity. For example, upon determining that user 206 is speaking on a phone, smart assistant software 116 may consider user 206 as in "do not disturb" status according to one or more profile settings relating to phone calls. For example, smart assistant software 116 can be paired with the smart phone of user 206 prior to user 206 receiving the phone call. As such, smart assistant software 116 can then issue the command to device 120 without a verbal communication element, as to not interrupt the phone conversation. In another example embodiment, upon determining that user 206 is not to be disturbed with a verbal command, smart assistant software 116 can project an image of the command so that the command can be visibly seen, while simultaneously sending the command to device 120 via other means. In other example embodiments, smart assistant software 116 can display the verbal command on a smart phone or a smart watch worn by user 206.

In other example embodiments, smart assistant software 116 can consider the contextual relevance of user 206 when deriving an appropriate verbal command. For example, smart assistant software 116 can determine if user 206 would care to hear the verbal command out loud. For example, user 206 may not care about the status of a cleaning robot if he or she is busy working on writing a report or an overdue application. Smart assistant software 116 can determine, using camera 114, that user 206 is working on another computing device to write the overdue application. As such, smart assistant software 116 can then issue the command to device 120 without a verbal communication element. In other example embodiments, user 206 can verbally issue a command to smart assistant software 116, on device 102, to state that user 206 is to not be disturbed.

As a result, a relevant verbal command is determined based upon who the nearby user is, what level of detail the would like to hear, whether the command is appropriate given the nearby user's current activity, and the contextual relevance of the command to the nearby user's current situation.

In step 308, smart assistant software 116 generates instructions for device 120 to perform the identified task. For example, smart assistant software 116 may use a text to speech application to generate the verbal command for device 120. In other example embodiments, smart assistant software 116 may use a pre-selected voice based on the identified nearby user's profile. For example, a first user may have selected a male voice to emit the verbal commands, and a second user may have selected a female voice to emit the verbal commands.

Smart assistant software 116, on device 102, then audibly emits the verbal command, wherein the audibly emitted verbal command is within range of the both user 206 and device 120 as depicted in step 310 and illustrated in FIG. 2. In one example embodiment, audibly emitting the verbal command includes vocalizing the generated verbal command based on the gathered one or more requirements of the identified task and the level of detail of the customization that is defined in the user profile of the detected user. For example, based on the derived verbal command, smart assistant software 116 can emit a verbal command stating, "cleaning the kitchen floor." If user 206 prefers a higher level of detail, smart assistant software 116 can emit a verbal command stating, "cleaning the broken glass on the kitchen floor near the refrigerator." If the current activity of user 206 is determined to be talking on the phone, smart assistant software 116, based on a user profile setting, can consider user 206 to not be disturbed and initiates the command to device 120 without a verbal element. If smart assistant software 116 determines that based on the contextual relevance of user 206 that the user would not care to hear the communication out loud, smart assistant software 116 can consider user 206 as not wanting to be disturbed and initiates the command to device 120 without a verbal element.

Figure 4:
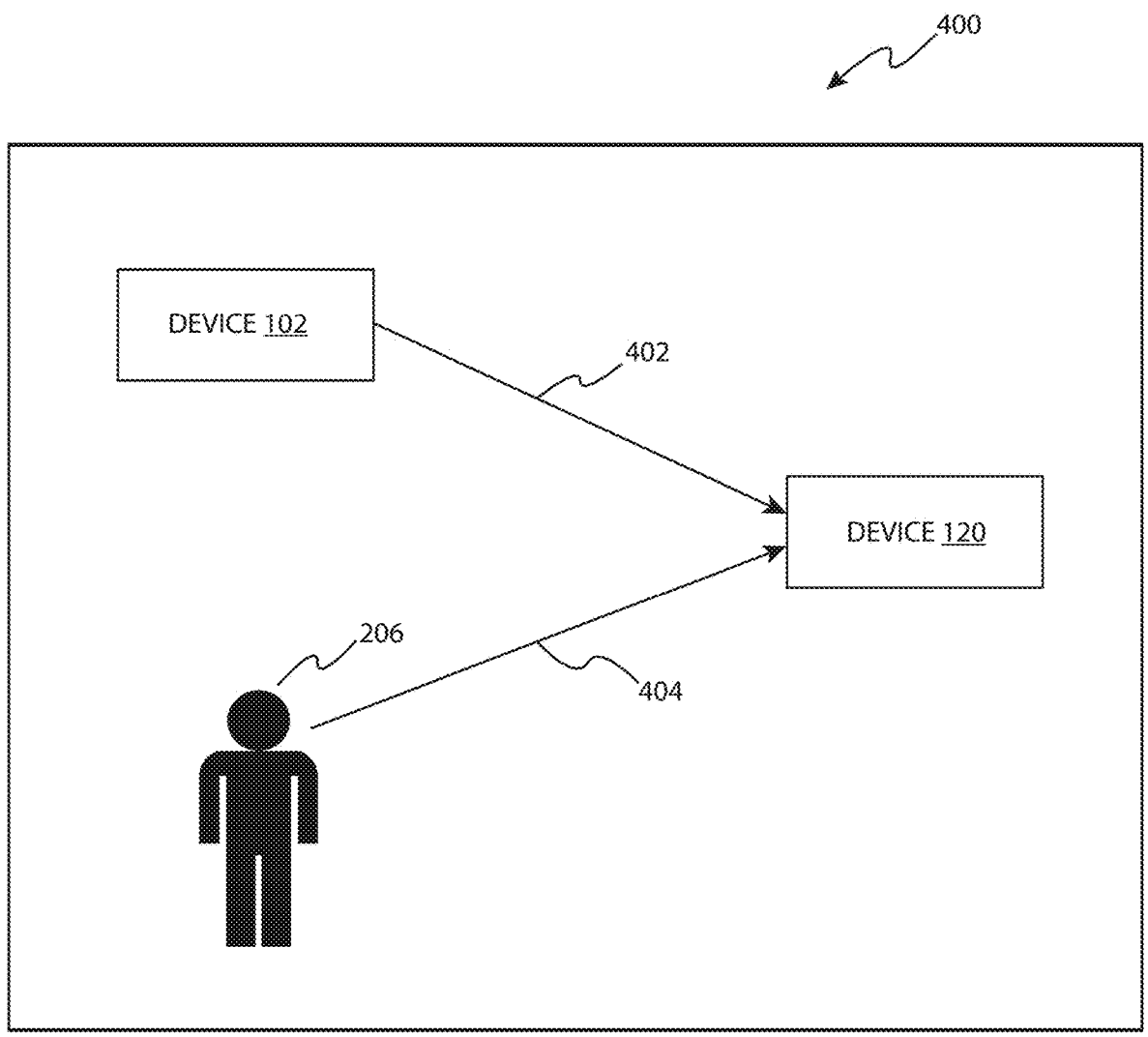
FIG. 4 depicts a smart assistant software emitting a verbal command and a nearby user altering or appending the operation within the smart assistant environment of FIG. 1, in an embodiment in accordance with the present invention.
Figure 5:
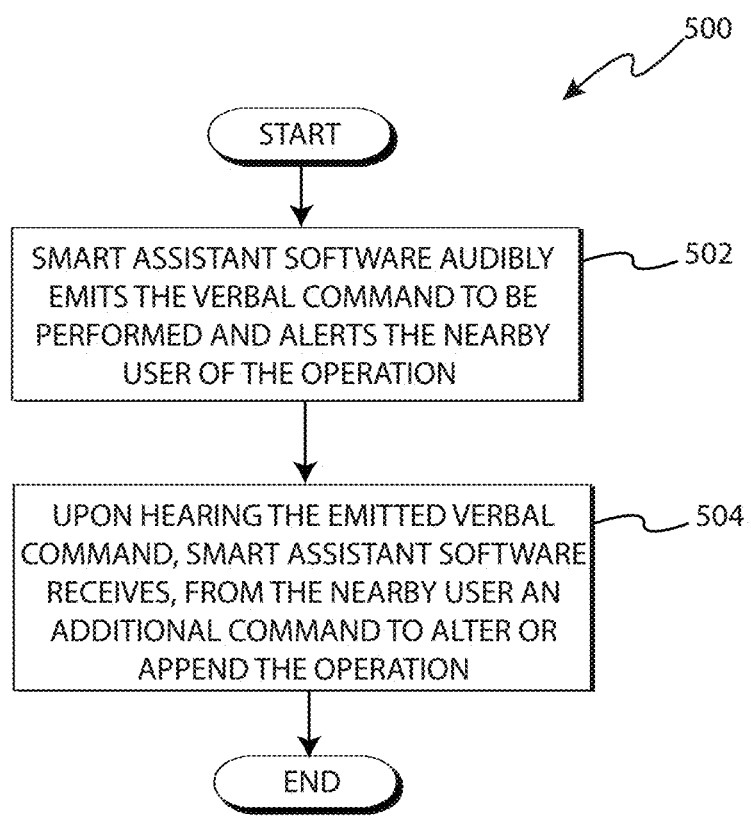
FIG. 5 is a flowchart depicting operational steps of a smart assistant software emitting a verbal command and a nearby user altering or appending the operation within the smart assistant environment of FIG. 1, in an embodiment in accordance with the present invention.

FIG. 4, generally designated 400, depicts a smart assistant software emitting a verbal command and a nearby user altering or appending the operation within the smart assistant environment of FIG. 1, in an embodiment in accordance with the present invention. FIG. 5 is a flowchart, generally designated 500, depicting operational steps of the smart assistant software depicted in FIG. 4, within the smart assistant environment of FIG. 1, in an embodiment in accordance with the present invention. For example, upon detecting user 206 and rendering an appropriate verbal command based on a customization level for user 206, smart assistant software 116 audibly emits verbal command 402 to be performed by device 120 and alerts nearby user 206 of the operation as depicted by step 502 and reference indicator 402 in FIG. 4.

In step 504, upon hearing emitted verbal command 402, smart assistant software 116 receives an additional verbal command 404 from user 206 as illustrated by reference indicator 404 in FIG. 4. For example, upon hearing the emitted verbal command 402 "cleaning the broken glass on the kitchen floor near the refrigerator," user 206 speaks an additional verbal command 404 of "and clean the floor near the stove." As a result, smart assistant software 116 modifies the verbal command for device 120, wherein the new command instructs device 120 to clean the kitchen floor near the refrigerator and then the floor near stove 204. As a result, smart assistant software 116 can emit an updated verbal command "cleaning the broken glass on the kitchen floor near the refrigerator and clean the floor near the stove." In another example embodiment, device 120 may emit the updated portion of the verbal command. For example, smart assistant software 116 on device 102 can emit verbal command 402 "cleaning the broken glass on the kitchen floor near the refrigerator," and smart assistant software 134, on device 120, can emit additional verbal command 404 of "and clean the floor near the stove."

Figure 6A:
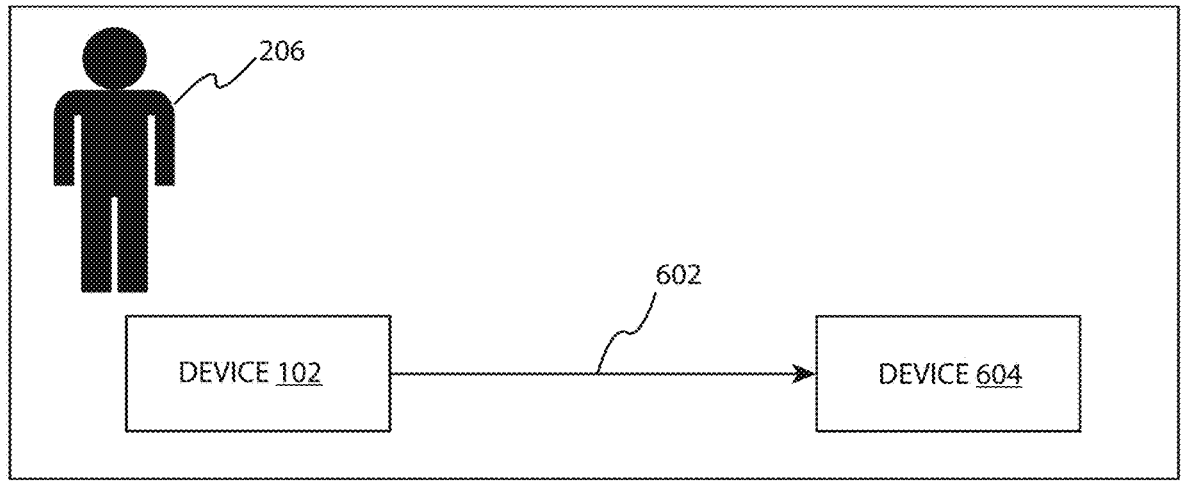
FIGS. 6A and 6B depict a device-to-device communication within the smart assistant environment of FIG. 1, where a verbal command is altered upon detecting a second user, in an embodiment in accordance with the present invention.
Figure 6B:
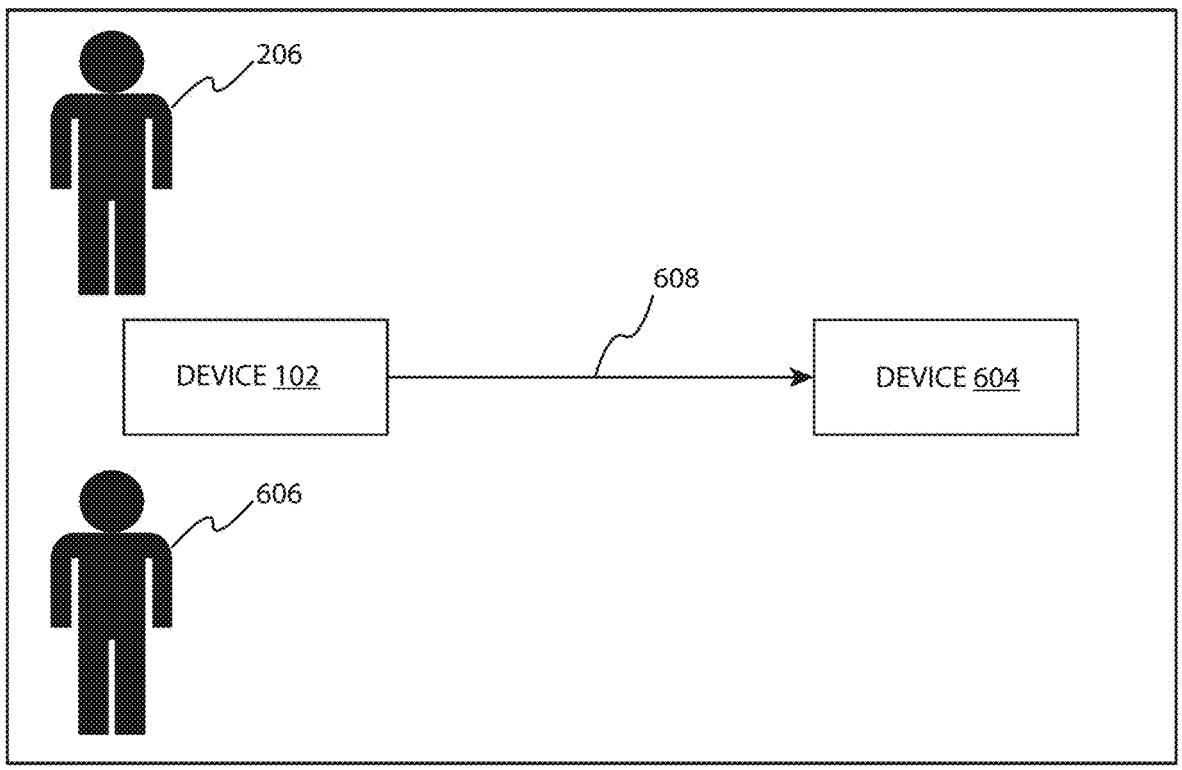

FIGS. 6A and 6B depict a device-to-device communication within the smart assistant environment of FIG. 1, where a verbal command is altered upon detecting a second user, in an embodiment in accordance with the present invention. In an example embodiment, an IoT enabled smart light switch 604 detects user 206 is returning home late in the evening and determines to turn on the lights so user 206 can see where he or she is walking upon entering the home. Based on the stored user profile for user 206, smart assistant software determines that the lights can be turned on at a normal illumination level and emits a verbal command to turn on the lights as depicted by reference indicator 602 in FIG. 6A. As user 206 walks through the doorway, smart light switch 604 detects a second user. For example, the second user may be a small child (e.g., infant 606, see FIG. 6B), who is sleeping and should not be woken by the bright lights. Based on the current state of infant 606, smart assistant software 116 determines that the lights should be dimmed to a level that will not cause infant 606 to wake up. Further, smart assistant software 116 also detects that infant 606 is sleeping and determines not to emit the second command to dim the lights. As a result, the second command is transmitted to smart light switch 604 over a data connection on network 118 as depicted by reference indicator 608.

In another example embodiment, smart assistant software 116 may render the verbal command based on one or more stored user preferences in the stored user profile of user 206. For example, user 206 can define preferred units of measurement to be used when smart assistant software 116 renders a verbal command. For example, user 206 may prefer to hear the hue of the lights to be expressed in Kelvin. Kelvin is a measurement used to describe the color temperature of a light source. This is the specification that gives a description of the warmth or coolness of a light source. Continuing with the previous example embodiment of FIGS. 6A and 6B, as user 206 passes through the doorway, the resulting verbal command can be "Turn on lights at 2700 Kelvin." However, upon detecting a third user (not shown), smart assistant software 116 may determine that the third prefers to hear units or measurement in layperson terms. For example, as the third user enters the doorway, the resulting verbal command can be "Turn on lights to soft white."

Figure 7:
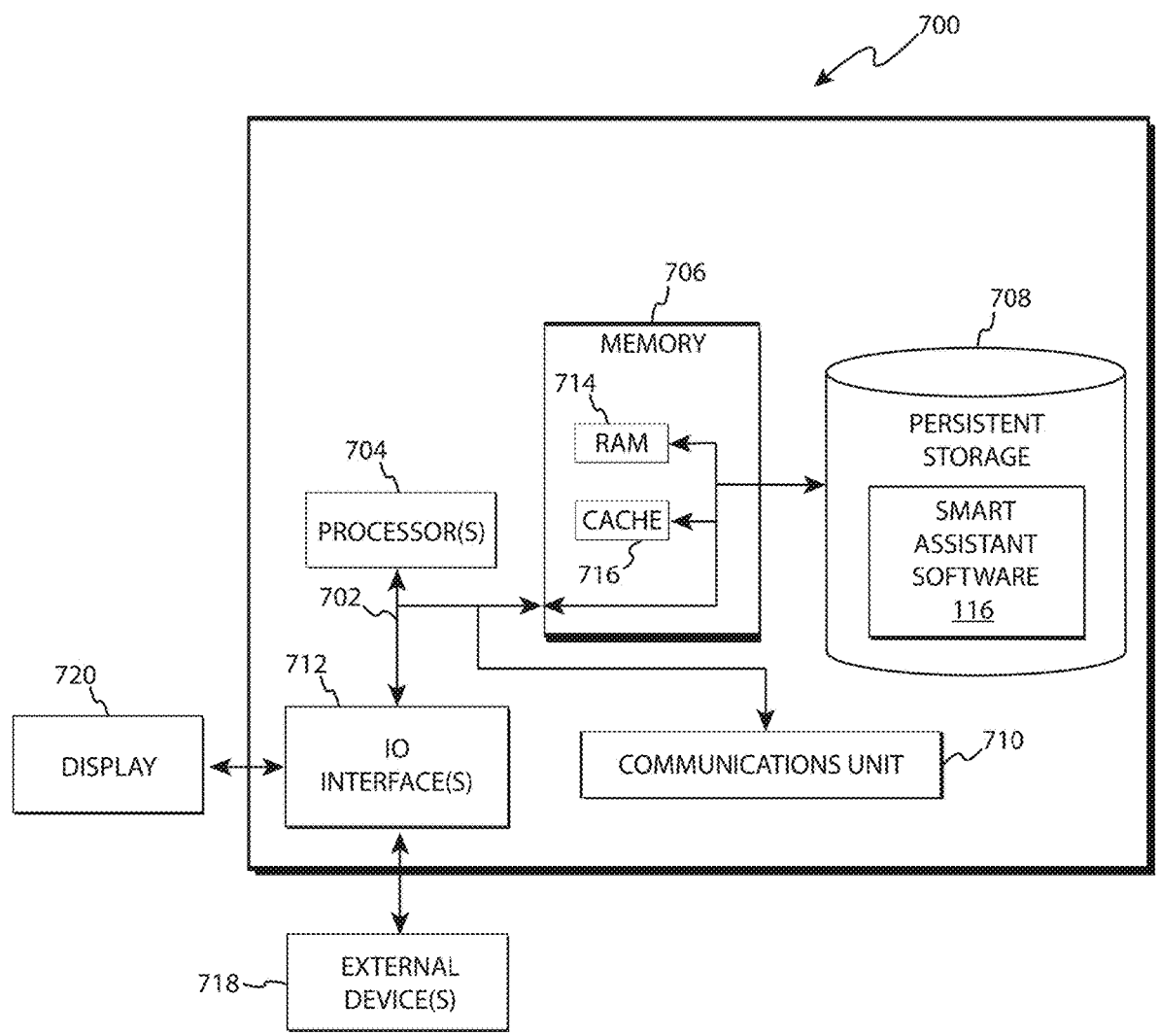
FIG. 7 depicts a block diagram of components of the computer executing the intelligent mapping program, in an embodiment in accordance with the present invention.

FIG. 7 depicts a block diagram, generally designated 700, of components of the computer executing the smart assistant software, in an embodiment in accordance with the present invention. It should be appreciated that FIG. 7 provides only an illustration of one implementation and does not imply any limitations with regard to the environments in which different embodiments may be implemented. Many modifications to the depicted environment may be made.

Device 102 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Smart assistant software 116 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of network 118 and devices 102, 120, and 604. In these examples, communications unit 710 includes one or more network interface cards. Communications unit 710 may provide communications through the use of either or both physical and wireless communications links. Smart assistant software 116 may be downloaded to persistent storage 708 through communications unit 710.

I/O interface(s) 712 allows for input and output of data with other devices that may be connected to device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., smart assistant software 116, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer-implemented method comprising:
    detecting, by one or more computer processors of a first device, that a user is present, wherein the user is detected by a first instance of a smart assistant software executing on the first device;
    identifying, by one or more computer processors of the first device, an occurrence of a monitored event;
    in response to identifying the occurrence of the monitored event, determining, by one or more computer processors of the first device, a task to be performed by a second device, wherein a second instance of the smart assistant software is executing on the second device;
    generating, by one or more computer processors of the first device, a verbal instruction, wherein the verbal instruction instructs the second device to perform the task; and
    audibly emitting, by one or more computer processors of the first device, the verbal instruction, wherein the audibly emitted verbal instruction is within audible range of both the user and the second device;
    wherein detecting that the user is present includes:
        identifying, by one or more computer processors of the first device, one or more media files depicting the user,
        associating, by one or more computer processors of the first device, the identified one or more media files with a user profile of the user, and
        determining, by one or more computer processors of the first device, whether the user is within hearing distance of the first device and the second device based, at least in part, on the one or more media files associated with the user profile.

2. The computer-implemented method of claim 1, wherein determining the task to be performed by the second device includes:
    identifying, by one or more computer processors of the first device, a task from a plurality of defined tasks performable by the second device, wherein the occurrence of the monitored event matches one or more requirements of the identified task; and
    selecting, by one or more computer processors of the first device, the identified task to be performed by the second device.

3. The computer-implemented method of claim 1, wherein generating the verbal instruction includes:
    gathering, by one or more computer processors of the first device, one or more requirements of the identified task; and
    generating, by one or more computer processors of the first device, the verbal instruction, wherein the verbal instruction includes the one or more requirements of the identified task and one or more details based on a customization defined in the user profile of the detected user.

4. The computer-implemented method of claim 3, wherein the customization defined in the user profile includes:
    a level of detail, wherein the level of detail determines an amount of the one or more details to be included in the verbal instruction;
    a current activity of the user; and
    a contextual relevance, wherein the contextual relevance determines whether the user would prefer to hear the verbal instruction based on the user's current activity.

5. The computer-implemented method of claim 4, wherein audibly emitting the verbal instruction includes vocalizing the generated verbal instruction based on the gathered one or more requirements of the identified task and the level of detail of the customization that is defined in the user profile of the detected user.

6. The computer-implemented method of claim 1, wherein detecting that the user is present includes:
    detecting, by one or more computer processors of the first device, a Bluetooth enabled device of the user, wherein the Bluetooth enabled device is used to triangulate the location of the user with regard to the first device and second device.

7. A computer program product comprising:
    one or more computer readable storage media and program instructions stored on the one or more computer readable storage media, wherein the one or more computer readable storage media are not transitory signals per se, the stored program instructions comprising:
        program instructions to detect, by a first device, that a user is present, wherein the user is detected by a first instance of a smart assistant software executing on the first device;
        program instructions to identify, by the first device, an occurrence of a monitored event;
        program instructions to, in response to identifying the occurrence of the monitored event, determine, by the first device, a task to be performed by a second device, wherein a second instance of the smart assistant software is executing on the second device;
        program instructions to generate, by the first device, a verbal instruction, wherein the verbal instruction instructs the second device to perform the task; and
        program instructions to audibly emit, by the first device, the verbal instruction, wherein the audibly emitted verbal instruction is within audible range of both the user and the second device;
        wherein the program instructions to detect that the user is present include:
            program instructions to identify, by the first device, one or more media files depicting the user,
            program instructions to associate, by the first device, the identified one or more media files with a user profile of the user, and
            program instructions to determine, by the first device, whether the user is within hearing distance of the first device and the second device based, at least in part, on the one or more media files associated with the user profile.

8. The computer program product of claim 7, wherein the program instructions to determine the task to be performed by the second device include:
    program instructions to identify, by the first device, a task from a plurality of defined tasks performable by the second device, wherein the occurrence of the monitored event matches one or more requirements of the identified task; and program instructions to select, by the first device, the identified task to be performed by the second device.

9. The computer program product of claim 7, wherein the program instructions to generate the verbal instruction include:
   program instructions to gather, by the first device, one or more requirements of the identified task; and
   program instructions to generate, by the first device, the verbal instruction, wherein the verbal instruction includes the one or more requirements of the identified task and one or more details based on a customization defined in the user profile of the detected user.

10. The computer program product of claim 9, wherein the customization defined in the user profile includes:
   a level of detail, wherein the level of detail determines an amount of the one or more details to be included in the verbal instruction;
   a current activity of the user; and
   a contextual relevance, wherein the contextual relevance determines whether the user would prefer to hear the verbal instruction based on the user's current activity.

11. The computer program product of claim 10, wherein audibly emitting the verbal instruction includes vocalizing the generated verbal instruction based on the gathered one or more requirements of the identified task and the level of detail of the customization that is defined in the user profile of the detected user.

12. The computer program product of claim 7, wherein the program instructions to detect that the user is present include:
   program instructions to detect, by the first device, a Bluetooth enabled device of the user, wherein the Bluetooth enabled device is used to triangulate the location of the user with regard to the first device and second device.

13. A computer system comprising:
   one or more computer processors;
   one or more computer readable storage media;
   program instructions stored on the computer readable storage media for execution by at least one of the one or more processors, the stored program instructions comprising:
      program instructions to detect, by a first device, that a user is present, wherein the user is detected by a first instance of a smart assistant software executing on the first device;
      program instructions to identify, by the first device, an occurrence of a monitored event;
      program instructions to, in response to identifying the occurrence of the monitored event, determine, by the first device, a task to be performed by a second device, wherein a second instance of the smart assistant software is executing on the second device;
      program instructions to generate, by the first device, a verbal instruction, wherein the verbal instruction instructs the second device to perform the task; and
      program instructions to audibly emit, by the first device, the verbal instruction, wherein the audibly emitted verbal instruction is within audible range of both the user and the second device;
   wherein the program instructions to detect that the user is present include:
      program instructions to identify, by the first device, one or more media files depicting the user,
      program instructions to associate, by the first device, the identified one or more media files with a user profile of the user, and
      program instructions to determine, by the first device, whether the user is within hearing distance of the first device and the second device based, at least in part, on the one or more media files associated with the user profile.

14. The computer system of claim 13, wherein the program instructions to determine the task to be performed by the second device include:
   program instructions to identify, by the first device, a task from a plurality of defined tasks performable by the second device, wherein the occurrence of the monitored event matches one or more requirements of the identified task; and
   program instructions to select, by the first device, the identified task to be performed by the second device.

15. The computer system of claim 13, wherein the program instructions to generate the verbal instruction include:
   program instructions to gather, by the first device, one or more requirements of the identified task; and
   program instructions to generate, by the first device, the verbal instruction, wherein the verbal instruction includes the one or more requirements of the identified task and one or more details based on a customization defined in the user profile of the detected user.

16. The computer system of claim 15, wherein the customization defined in the user profile includes:
   a level of detail, wherein the level of detail determines an amount of the one or more details to be included in the verbal instruction;
   a current activity of the user; and
   a contextual relevance, wherein the contextual relevance determines whether the user would prefer to hear the verbal instruction based on the user's current activity.

17. The computer system of claim 16, wherein audibly emitting the verbal instruction includes vocalizing the generated verbal instruction based on the gathered one or more requirements of the identified task and the level of detail of the customization that is defined in the user profile of the detected user.

* * * * *